April 13, 1948.     J. ZALKIND     2,439,537
BOOKKEEPING APPLIANCE

Filed May 12, 1945     4 Sheets-Sheet 1

INVENTOR.

BY JOSEPH ZALKIND

John P. Mikonov

ATTORNEY

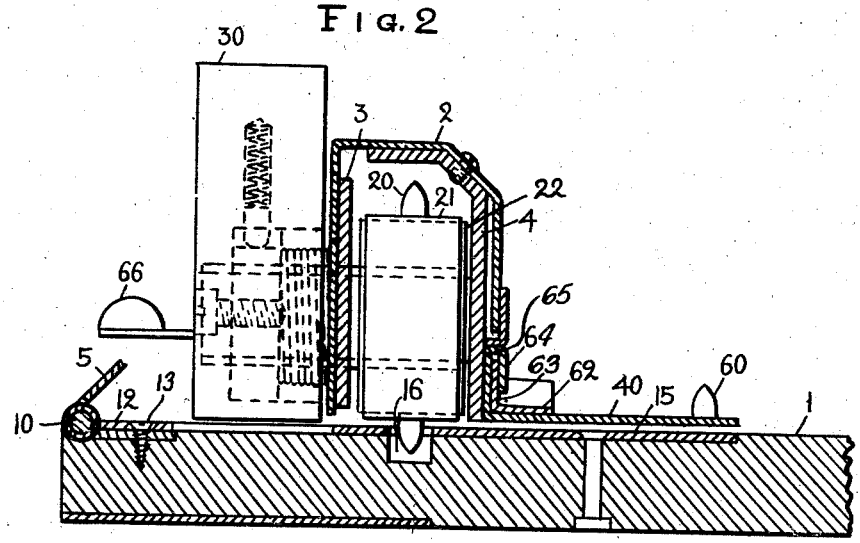

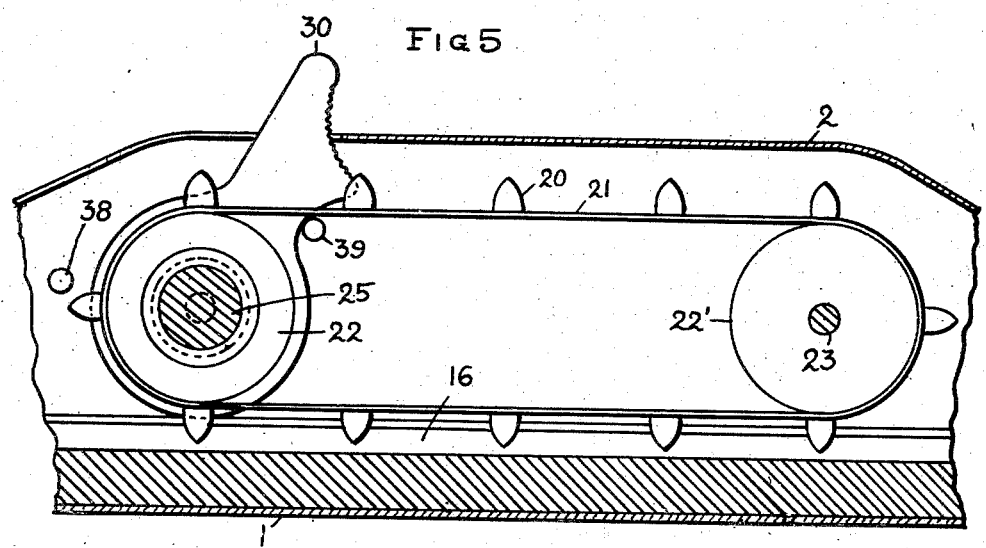
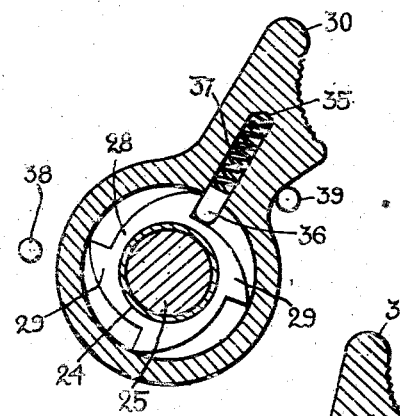
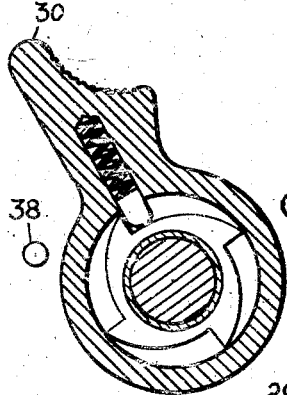
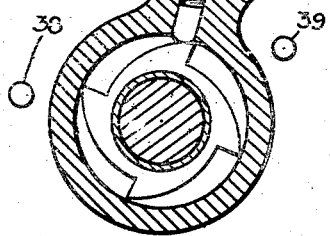
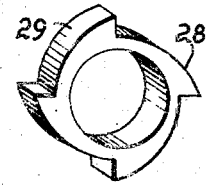
Joseph Zalkind
INVENTOR.

April 13, 1948.  J. ZALKIND  2,439,537
BOOKKEEPING APPLIANCE
Filed May 12, 1945   4 Sheets-Sheet 4
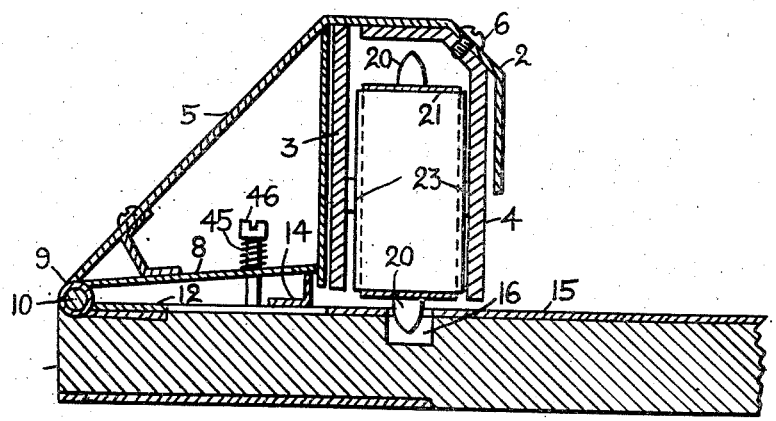
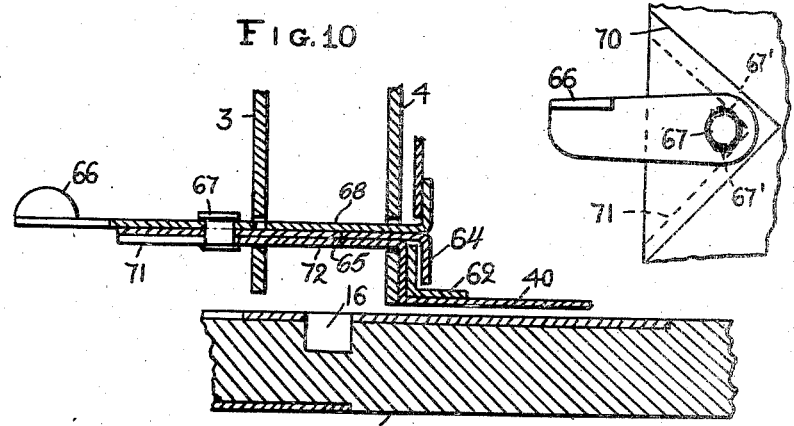
JOSEPH ZALKIND
INVENTOR.
BY John P. Wilson
ATTORNEY Patented Apr. 13, 1948

2,439,537

UNITED STATES PATENT OFFICE 2,439,537

BOOKKEEPING APPLIANCE

Joseph Zalkind, New York, N. Y.

Application May 12, 1945, Serial No. 593,347

9 Claims. (Cl. 282—29)

My invention relates to bookkeeping appliances and has particular reference to appliances for making manually simultaneous entries on specially prepared printed blanks or forms.

My invention has further reference to appliances which can be used for making entries on individual forms, for instance, on payroll receipts or checks, and, at the same time, making the same record on a ledger sheet or on a master form, proof sheet or registry sheet, on which the individual records are successively transferred. For such an operation it is necessary to have a device in which the individual forms are accurately positioned on a series of pins or pegs over a master form, and a mechanism is provided for moving the master form exactly the required distance after each individual record, for bringing a new bracket or horizontal column on the master form under the individual form.

The forms for this purpose are usually provided with perforations registering with the pegs on the appliance. The perforations on the master form are engaged by a rotary device for moving the master form for a predetermined distance after each recording or entry, the rotary device being usually made in the form of a wheel with radially projecting pins or pegs which engage the holes in the master form. Such an arrangement has a disadvantage in that the radial pegs cannot accurately engage the perforations, and, moreover, there being only a few pegs (usually only one) which correctly and fully engage the perforations, the master form is not moved accurately and may be displaced to one side or the other so that the lines or columns on the master form will no longer accurately correspond to the similar lines or columns in the individual forms. There is also a danger that the paper at the perforations being engaged by very few pegs, may be torn or otherwise damaged when the form is moved rapidly.

The main object of my invention is therefore to provide an appliance in which the master form is moved by a plurality of pegs mounted on a caterpillar belt, simultaneously engaging the corresponding perforations, all these pegs being in an alignment with each other so that the form is accurately moved in the same direction and cannot be damaged by the pegs even when moved very rapidly.

Another object of my invention is to provide an appliance in which the pegs are placed into the perforations in the master forms from the top so that a more accurate alignment of the various forms is possible; moreover, with this arrangement it is possible to use non-perforated master forms, by using sharp pegs for making perforations when the form is placed on the base of the device.

Another object of my invention is to provide an adjustable form holder which can be placed in any desired position for accurately locating a form on the base of the device.

Another object of my invention is to provide a bookkeeping appliance in which different forms can be placed in any desired order, their relative positions being correctly aligned by the particular arrangement of the supporting members and pins. Thus it is possible, for instance, to place the pay period form above the receipts and checks for one particular pay period so that the general pay period form will have the original records.

Another object of my invention is to provide an appliance in which the moving or operating parts are substantially covered and otherwise protected, and which is always ready for the operation even by inexperienced operators, being simple, rugged and practically foolproof in its construction.

My invention is more fully described in the accompanying specifications and drawings in which:

Fig. 2 is a sectional view on an enlarged scale taken on the line 2—2 of Fig. 1;

Fig. 3 is a similar sectional view taken on the line 3—3 of Fig. 1;

Fig. 4 is a detail view of a portion of an endless belt with a peg;

Fig. 5 is a fractional sectional view on an enlarged scale taken on the line 5—5 of Fig. 1;

Figs. 6 and 7 and 8 are detail views of an operating handle in different positions;

Fig. 9 is a fractional sectional view on an enlarged scale taken on the line 9—9 of Fig. 1;

Fig. 10 is a similar view taken on the line 10—10 of Fig. 1;

Fig. 11 is a perspective view of a ratchet wheel for moving the belt with the pegs;

Fig. 14 is a detail view of a locking device for the form gauge.

Figure 1:
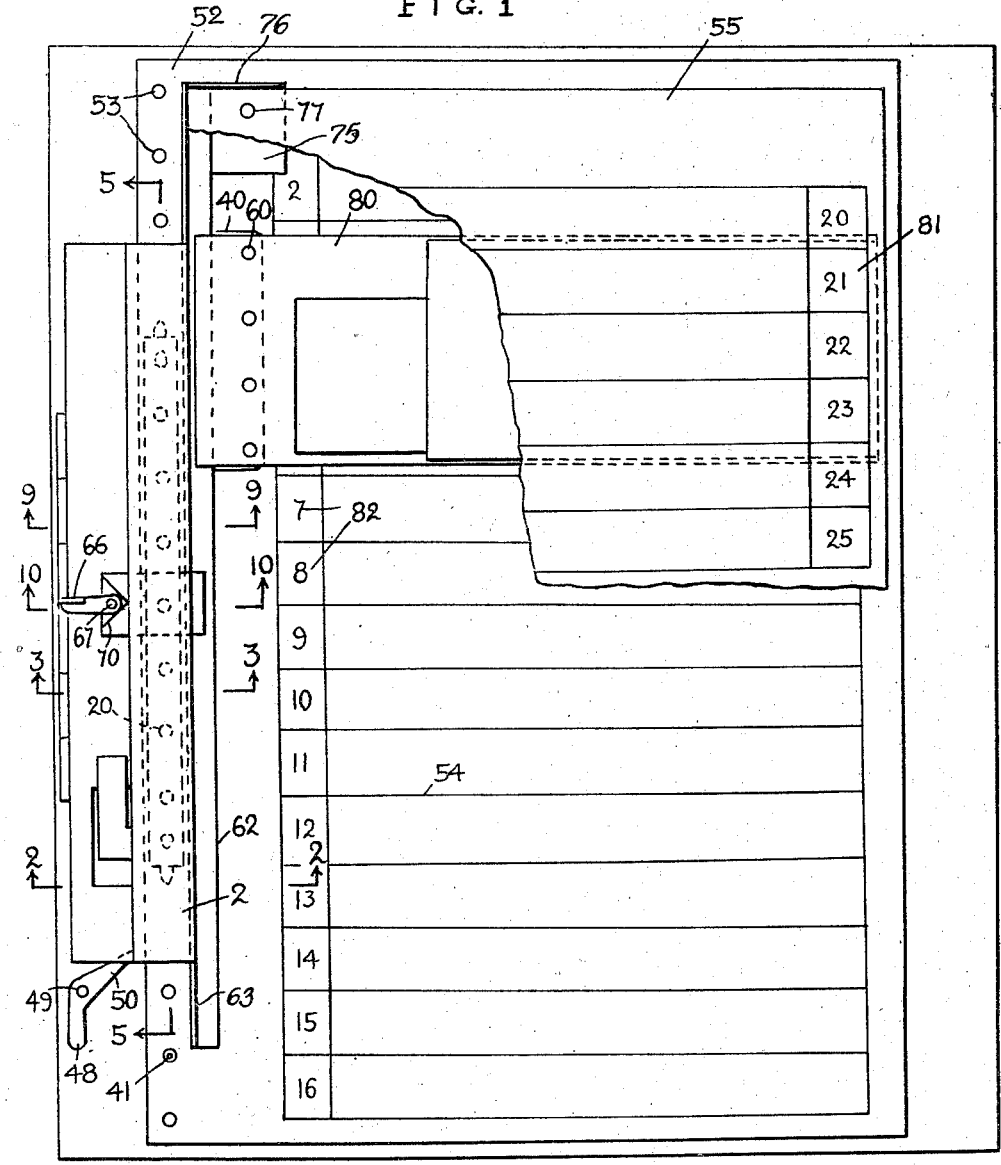
Fig. 1 is a plan view of my appliance showing also several printed forms assembled for making entries.
Figure 12:
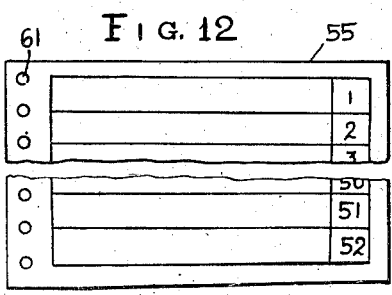
Figs. 12 and 13 are views of typical individual forms which may be used with my device.

My bookkeeping appliance comprises a base 1 which may be made of metal, wood, plastic or similar material, preferably of a rectangular shape. The operating mechanism is supported in a housing 2 having side walls 3 and 4 to which a cover 5 is attached as by screws 6. A rear plate 8 extends from the lower edge of the outer wall of housing 2 and is provided with hinge loops 9 engaging a pin 10 which is also engaged by hinge loops on a hinge plate 12. The latter is affixed to the base 1 as by screws 13. A post 14 holds the housing at an elevation above the board or base 1. A metal plate 15 is attached to the base 1 under the housing. The plate 15 and the base under the plate are provided with a longitudinal slot 16 registering with sharp-pointed pegs 20 on an endless belt 21 made of a steel strip and mounted on pulleys 22, 22'. The pegs are undercut at the bases as shown in Fig. 4 and the ends of the pegs are riveted in countersunk holes in the strip 21 so that the strip is smooth on the inside where it moves over the pulleys. The rear pulley 22' rotates directly on a shaft 23 supported in the walls 3 and 4. The front pulley is secured on a tube 24 rotatively mounted on a shaft 25 journaled in a bearing in the wall 3. The rear end of the shaft 25 is fastened to the wall 4 at 26. The outer end of the tube 24 mounts a ratchet wheel 28 with teeth 29. For rotating the ratchet wheel, a handle 30 is provided rotatively mounted on a screw 27 to the outer end of the shaft 25 and provided with a bore 32 for the ratchet wheel 28. A helical spring 33 is attached at one end to the wall 3 of the housing, the other end of the spring being attached to the handle 30. The spring is placed under tension so that it urges the handle rearwards, into an inoperative position as shown in Fig. 5. The handle is provided with a bore 35 for a sliding pin 36 urged outside by a spring 37. The pin engages one of the teeth of the ratchet wheel so that the ratchet wheel is rotated when the handle is moved manually backwards. Pins 38, 39 (Fig. 6) limit the movement of the handle so that for every movement of the latter, the ratchet wheel 28 is turned for an angular distance between two teeth. The belt or strip 21 is moved exactly through a distance equal to the distance between two consecutive pegs 20, the angular distance between the two pegs being the same as the angular distance between two teeth of the wheel 28. It is, of course, understood that the angular distance between the two pegs 20 may be different from that between the two teeth 29 of wheel 28, so that the linear travel of the belt 21 may be varied as desired such as by changing the number of teeth on the wheel 28. Different positions of the handle are shown more clearly in Figs. 6, 7 and 8.

Figure 13:
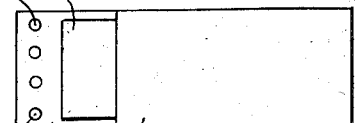

The lower side of the belt 21 is at the same level as a plate 40 extending from the inner wall 4 of the housing. The housing with the plate 40 is normally held at a certain elevation above the surface of the base by the post 14 on the base 1. The housing is urged downwards against the lug 14 by a helical spring 45 on a screw 46, the lower end of the spring resting on the plate 8. In this position of the housing 2, the pegs slide in the groove 16 in the base. For raising the housing so as to raise the pegs from the groove 16 for inserting a sheet of paper under the housing, a cam lever 48 is provided, pivoted at 49 on the base 1 and having a tapering or cam portion 50 which slides under plate 8 when the lever 48 is rotated. By turning the lever 48 to the left, the cam portion of the lever enters under the wall 8, raising the same and the housing to a sufficient height to clear the space under the housing for inserting a sheet of paper. The screw 46 limits the upward movement of the housing so that the latter cannot be turned completely over, but merely raised, sufficiently to insert a new form. The master form 52, shown in Fig. 1, is preferably provided with equally spaced perforations 53 at the left edge, the pitch of the perforations being the same as the pitch of the pegs 20 on the belt 21. The master form is then placed on the board in such a position that its perforations correspond to the position of the pegs 20. The correct longitudinal position can be easily found by observing a mark 41 on the base 1 which can be seen through one of the perforations 53. The master sheet or form may be of any suitable design for any particular purpose suitable to my device, for instance, as a pay record sheet of employees. In such a case the form is provided with lines 54 spaced in accordance with the space of the perforations 53 or distances between the pegs 20. Each space between the lines is assigned to the pay record of a particular employee for a given pay period. The pay record of each employee is kept on sheets 55 which can be used in my appliance in connection with the master sheet 52, and in connection with a pay check 56 and an employee's receipt 57, which may be separated by transfer carbon sheets 58. The individual forms 55, 56, 57 are mounted on pins 60 on the extension plate 40, for which purpose the forms are provided with perforations 61 (Fig. 13). For placing the pay period sheet 55 in the correct position for a given pay period, an adjustable guide bar 62 is provided, slidably supported on the extension plate 40. The bar 62 is provided with a vertical flange 63 held by a depending flange 64 on a locking plate 65 slidably supported in slots in the walls 2 and 3. The locking plate beyond the cover 5 of the housing as shown in Figs. 9, 10 and 14, is provided with a locking lever or handle 66 pivotally supported on top of the locking plate on a pin 67. An upper guiding plate 68 is provided for guiding the locking plate in its movements. A triangular recess 70 is provided in the upper plate for allowing rotational movements of the locking lever 66. A similar triangular recess 71 is provided in a supporting plate 72 which may be formed integrally with the extension plate 40. The recess 71 is engaged by the pin 67 which in this place is of an enlarged oval section as shown in dotted lines in Fig. 14. By turning the handle 66 straight outwards as shown in Figs. 1 and 14, the projecting sides 67' of the pin 67 are brought to bear against the edges of the supporting plate 72 in the slot, causing the plate 65 to be drawn outwards thereby locking the guide bar 62 in a selected position. By turning the lever to the side, the oval pin 67 releases the sides of the recess 71, allowing the locking plate 65 to be moved inwards, releasing the guide bar 62.

The bar 62 is provided at the end with a supporting piece 75 having a flange 76 for guiding the upper edge of the form 55. A guiding pin 77 is secured on the supporting piece for retaining the upper edge of the sheet 55 in the correct position.

The device is used with the particular forms as follows:

The master form 52 is placed in a correct position on the base 1, with the perforations 53 registering with the pins 20 of the propelling caterpillar belt 21 and using the mark 41 to guide the form.

Next, the pay period form 55, pay check 56, and carbon transfer sheets 58 above and below the check 56 are placed in any desired order, with the pay period form 55 on top if it is desired to have the original record thereon. These forms are mounted with their perforations 61 engaging the pins 60 on the extension plate 40 as shown in Fig. 1. The pay period form 55 is similarly placed on the pins 60 so that the graph for the particular pay period, for instance, 21st week, as shown by numerals 81 on the sheet 55, opposite the upper portions of the check and receipt forms as shown. The guide bar 62 is so adjusted that its end pin 77 enters the end perforation in the form 55, and the bar 62 is locked in this position by the locking lever 66. The handle 30 is then operated for moving the belt 21 until the bracket for the first employee as indicated by the corresponding number 82 on the form 52 is aligned with the selected bracket 81. The name of the employee and the amount of his pay are then written on the horizontal bracket 81 corresponding to the particular pay period, this writing being transferred to all the other forms, and will be recorded in the bracket 82 for the particular employee. His record for the particular pay period will be also recorded on his pay period form 55, and on his receipt 57, and check 56 will be filled in. The transfer carbons may be so arranged as to transmit only such legend as is needed for the next form. Upon completion of the record for one employee, the forms 55, 56, 57 are removed, the handle 30 is turned to move the master form 52 to the next bracket, and a new set of forms 55, 56, 57, for the next employee is placed on the pins 60, 77.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A bookkeeping appliance comprising a base adapted to support a master form; a housing pivotally supported on the base above the marginal edge of the master form; means in the housing to manually move the master form one step at a time; a plate extending from the housing above the master form; means to support the housing and the plate at an elevation above the master form at a small distance therefrom; means on the extension plate to support relatively small forms; an adjustable guide bar on the housing for supporting a sheet on top of the forms; and means on the guide bar for locating the outer edge of the sheet.

2. A bookkeeping appliance comprising a base adapted to support a relatively large master form; a housing pivotally supported on the base above the marginal edge of the master form; means in the housing to manually move the master form one step at a time; a plate extending from the housing above the master form; means to support the housing and the plate at an elevation above the master form at a small distance therefrom; means on the extension plate to support relatively small forms; a guide bar adjustably supported on the housing with a flange at one end at right angles to the bar for supporting a record sheet and for locating the edges of the record sheet.

3. A bookkeeping appliance comprising a base adapted to support a relatively large master form; a housing pivotally supported at one end of the base; means to support the housing at an elevation above the base at a short distance therefrom; means in the housing for manually moving the form sheet one step at a time; a plate extending from the housing; pins extending upwards from the plate for engaging corresponding perforations in individual forms and for supporting the individual forms above the master form in a contact therewith; a guiding bar slidably supported on the plate; a flange and a guiding pin at the end of the bar for locating the outer edge of an intermediate form.

4. A bookkeeping appliance comprising a base adapted to support a relatively large master form; a housing pivotally supported at one end of the base a plurality of pins movably supported in the housing arranged to engage the marginal edge of the master form; means to move the pins one step at a time for moving the master form; a plate extending from the housing; pins on the plate for engaging perforations in additional forms of relatively smaller sizes for aligning the additional forms with the master form; and a guide bar adjustably supported on the plate for positioning an additional form of an intermediate size.

5. A bookkeeping appliance comprising a base adapted to support a relatively large master form; a housing pivotally supported at one end of the base; yieldable means to support the housing at an elevation above the base at a short distance therefrom; a pair of pulleys rotatively supported in the housing; an endless belt on the pulleys; a plurality of equally spaced pins on the endless belt arranged to engage the master form from above; means to manually rotate one of the pulleys for moving the belt in steps equal to the distance between the consecutive pins; a plate extending from the housing; pins extending upwards from the plate for supporting additional forms; and a guide bar adjustably supported on the plate for positioning an intermediate form.

6. A bookkeeping appliance comprising a base adapted to support a relatively large master form; a housing pivotally supported at one end of the base; yieldable means to support the housing at an elevation above the base at a short distance therefrom; a pair of pulleys rotatively supported in the housing; an endless belt on the pulleys; a plurality of equally spaced pins on the endless belt arranged to engage corresponding perforations in the master form, the base having a slot for the ends of the pins under the master form; means to manually rotate one of the pulleys for moving the belt one step at a time, each step being equal to the distance between the consecutive pins; a plate extending from the housing; and pins extending upwards from the plate for supporting additional forms in contact with the master form.

7. A bookkeeping appliance comprising a base adapted to support a relatively large master form; a housing pivotally supported at one end of the base; yieldable means to support the housing at an elevation above the base at a short distance therefrom; a pair of pulleys rotatively supported in the housing; an endless belt on the pulleys; a plurality of equally spaced pins on the endless belt arranged to engage corresponding perforations in the master form, the base having a slot for the ends of the pins under the master form; a ratchet wheel connected with one of the pulleys; a handle rotatively supported coaxially to the ratchet wheel; a bowl on the handle for engaging the teeth of the ratchet wheel; yieldable means to urge the pawl against the teeth, the handle being arranged to be manually rotated for turning the ratchet wheel through an angular distance corresponding to the distance between the consecutive teeth thereby advancing the master form for a distance corresponding to the distance between the consecutive pins on the belt; a plate extending from the housing; and means on the plate for supporting additional forms in contact with the master forms.

8. A bookkeeping appliance comprising a base adapted to support a relatively large master form; a housing pivotally supported at one end of the base; a plurality of pins movably supported in the housing arranged to engage the marginal edge of the master form; means to move the pins one step at a time for moving the master form; a plate extending from the housing; pins on the plate for engaging perforations in additional forms of relatively smaller sizes for aligning the additional forms with the master form; a guide bar adjustably supported on the plate for positioning an additional form of an intermediate size; yieldable means to support the housing at an elevation above the base with the pins engaging the master form; means to manually raise the housing for releasing the pins from the master form; and means to limit the movement of the housing.

9. A bookkeeping appliance comprising a base adapted to support a registry sheet; a housing pivotally supported on the base above the marginal edge of the registry sheet; means in the housing to manually move the registry sheet one step at a time; a plate extending from the housing above the registry sheet; means to support the housing and the plate at an elevation above the registry sheet at a small distance therefrom; means on the extension plate to support additional sheets; an adjustable member for supporting a record sheet; and means on the adjustable member for locating the position of the record sheet.

JOSEPH ZALKIND.

REFERENCES CITED

The following references are of record in the file of this patent:

UNITED STATES PATENTS

| Number | Name | Date |
|---|---|---|
| 2,163,193 | Critchfield | June 20, 1939 |

FOREIGN PATENTS

| Number | Country | Date |
|---|---|---|
| 650,492 | Germany | Sept. 23, 1937 |
| 690,725 | Germany | May 6, 1940 |